United States Patent
Bissell et al.

(10) Patent No.: US 6,574,730 B1
(45) Date of Patent: *Jun. 3, 2003

(54) USER AUTHENTICATION IN A COMMUNICATIONS NETWORK

(75) Inventors: Robert Andrew Bissell, Ipswich (GB); Kevin Paul Bosworth, Ipswich (GB); Michael John Britnell, Milton Keynes (GB); Peter Maxwell Harding, Hayling Island (GB); Richard Middleton Hicks, Worcester (GB); Jonathan James Kingan, London (GB); Michael Victor Meyerstein, Ipswich (GB); Keith Eric Nolde, Ipswich (GB); John Rabson, Woodbridge (GB); Jonathan Crispin Ranger, deceased, late of Chichester (GB), by Barry Smith Ranger, administrator; David Anthony Roberts, Ipswich (GB); Mark Jonathan Stirland, Ipswich (GB); Richard Paul Swale, Ipswich (GB)

(73) Assignee: British Telecommunications plc, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/797,699

(22) Filed: Feb. 11, 1997

Related U.S. Application Data

(63) Continuation of application No. PCT/GB95/01937, filed on Aug. 16, 1995.

(30) Foreign Application Priority Data

Aug. 17, 1994 (GB) ............................................. 9416595

(51) Int. Cl.[7] ................................................. H04L 9/32
(52) U.S. Cl. ...................................... 713/168; 380/257
(58) Field of Search ............................. 386/21, 23, 25, 386/49; 713/168, 169; 380/257, 266, 262

(56) References Cited

U.S. PATENT DOCUMENTS

| | | | |
|---|---|---|---|
| 4,349,695 A | | 9/1982 | Morgan et al. |
| 4,423,287 A | * | 12/1983 | Zeidler ........................ 380/24 |
| 4,649,233 A | * | 3/1987 | Bass ........................... 380/21 |

(List continued on next page.)

FOREIGN PATENT DOCUMENTS

| | | |
|---|---|---|
| DE | 34 10 429 | 9/1985 |
| EP | 0 197 392 | 10/1986 |
| EP | 0 604 911 | 7/1994 |

OTHER PUBLICATIONS

Walker, Michael, "Security in Mobile and Cordless Telecommunications", Proceedings of the 6th Annual European Computer Conference, May 4, 1992, pp. 493–496.

*Primary Examiner*—Gilberto Barrón
(74) *Attorney, Agent, or Firm*—Nixon & Vanderhye, P.C.

(57) ABSTRACT

An authentication system of a terminal on a public switched telephone network provides a security node associated with a local exchange and a network terminal. For one-way authentication, the terminal responds to a call initiation by sending a unique authentication code comprising a number and a secret key encrypted according to a first algorithm, the secret key being specific to the terminal. The security node constructs the expected authentication code from the number, using the first algorithm and a second key which is a function of a terminal identification number, and compares the expected code with the received code. In two-way authentication, the security node responds to the call initiation by sending a transaction number to the terminal encrypted according to a second algorithm. The terminal generates the authentication code as a function of the first algorithm, the secret key and the transaction number. The authentication code is sent back to the security node. An expected code is compared with the received one in the same way. In both cases, a match between expected and received authentication codes constitutes authentication of the terminal allowing the user access to the network.

20 Claims, 1 Drawing Sheet

U.S. PATENT DOCUMENTS

| | | | | |
|---|---|---|---|---|
| 4,745,267 A | * | 5/1988 | Davis et al. | 235/379 |
| H510 H | * | 8/1988 | Clinch | 340/825.34 |
| 4,779,224 A | * | 10/1988 | Moseley et al. | 713/168 |
| 4,849,613 A | * | 7/1989 | Eisele | 235/379 |
| 4,862,501 A | * | 8/1989 | Kamitake et al. | 380/50 |
| 4,897,875 A | * | 1/1990 | Pollard et al. | 713/168 X |
| 5,056,140 A | | 10/1991 | Kimbell | |
| 5,231,666 A | * | 7/1993 | Matyas | 380/25 |
| 5,267,314 A | * | 11/1993 | Stambler | 380/24 |
| 5,272,754 A | * | 12/1993 | Boebert | 713/159 |
| 5,280,529 A | * | 1/1994 | Nost | 713/153 |
| 5,335,276 A | * | 8/1994 | Thomspon et al. | 380/21 |
| 5,390,252 A | * | 2/1995 | Suzuki et al. | 380/23 |
| 5,412,660 A | * | 5/1995 | Chen et al. | 370/110.1 |
| 5,488,649 A | * | 1/1996 | Schellinger | 379/62 |

* cited by examiner

USER AUTHENTICATION IN A COMMUNICATIONS NETWORK

This is a continuation of application No. PCT/GB95/01937, filed Aug. 16, 1995.

BACKGROUND OF THE INVENTION

1. Field of the Invention

This invention relates to terminal authentication in a communications network such as in a telecommunications network.

2. Description of the Related Art

In a typical network providing telephony, fax and associated services, such as a public switched telephone network (PSTN), customer premises equipment (CPE) is connected via network termination equipment (NTE) to the PSTN for mutual intercommunication via switches or exchanges which constitute nodes in the network. There are various levels of exchange. The exchange functionally nearest a customer's NTE, through which all calls to and from that customer may be routed, is known as the local exchange.

A telephone service is usually 'post-payment' in nature, i.e. billing is carried out retrospectively over a period since the last billing date. Apart from the basic security aspect, it is desirable to be able to authenticate the use of service user equipment to minimise the opportunity for unauthorised access to the network, as this may lead to billing disputes with the customer. For example, if an unauthorised user taps into a customer's line between the NTE and the local exchange, any chargeable service provided to the unauthorised user will be recorded as used by the authorised customer and billed accordingly.

Various systems are known for providing authentication. For example, a calling-card-based system involves the user keying in, through the telephone, a sequence of numbers to establish the user's identity. Another example is the use of a button, programmed to send a personal identification number (PIN), on the telephone equipment which allows access to an enhanced level of service, or an alternative network, through the same local exchange. For more specialist services this may be acceptable. However, such systems require the user to establish his or her identity as part of the call set-up procedure.

Although this added complexity may not be a severe problem on more specialist or less frequently used services, it is still an inconvenience which it would be advantageous to remove from that part of the call set-up procedure carried out by the customer. This is particularly so when the customer is using a standard service on a frequent basis. Removing the authentication steps from the customer would streamline the procedure considerably.

SUMMARY OF THE INVENTION

The present invention provides a method of authenticating a network terminal on a communications network, the method comprising the steps of:

indicating to a security node associated with the network that a user of the terminal requires use of the network;

calculating an authentication code at the terminal, the authentication code being a function of a transaction number encrypted by means of a first key associated with the terminal, and a first algorithm;

transmitting the authentication code to the security node;

calculating an expected transaction number at the security node based on the transaction number, the first algorithm and the first key;

comparing the expected authentication code with the received authentication code; and denying unrestricted access to the network for the terminal unless the expected and received authentication codes match.

The terminal may be part of an NTE with which the security node communicates to establish authentication or not. Alternatively, the terminal may be part of the actual customer equipment connected with the network through the NTE.

Preferably, the security node calculates at least one first key for the terminal, the or each first key being a function of a security algorithm stored within the node, the terminal identification code and a second key, the or each first key being loaded into the terminal for later use with the first algorithm in authenticating a terminal. Advantageously, the first key is a function of the terminal identification code encrypted by the second key using the security algorithm.

In a preferred embodiment, the transaction number is a variable number which is changed after each authentication attempt.

The security node may generate the transaction number, which is sent as a challenge to the terminal in response to the indication received by the security node that the user requires use of the network.

Conveniently, the security node prevents access to the network for the terminal in the event that no match between the expected and received authentication codes is made within a predetermined duration.

Preferably, the terminal transmits a negative acknowledgement to the security node in the event that no challenge, or an invalid challenge, is received following an indication that the user requires use of the network.

The first key may be loaded into the terminal remotely by the security node, or locally from storage means connected temporarily to the terminal.

Advantageously, the or each first key is identified at the security node by calculation from the terminal identification code. Alternatively, the or each first key is identified at the security node by means of a look-up table based on the terminal identification code.

Preferably, the security node permits a dial tone to be established with the terminal independent of the result of the authentication. In this case, the security node may permit access to the network for identifiable emergency traffic and/or non-chargeable traffic in the event that the expected and received authentication codes do not match.

The telecommunications network may have a plurality of exchanges, each for routing traffic to, and from, a plurality of terminals, at least one of the exchanges having the security node associated therewith.

The invention also provides a system for authenticating terminals on a communications network comprising a security node and a plurality of terminals connected to the network through the node, at least one of the terminals comprising processing means including a memory, and terminal signalling means operably connected to the network and enabled by the processing means, the terminal signalling means being arranged to transmit to the security node an authentication code after a potential user initiates a use of the network, the authentication code being calculated by the processing means as a function of a transaction number encrypted by means of a first algorithm and a first key associated with that terminal, the security node being operable to calculate an expected authentication code from that terminal using the transaction number, the first algorithm also stored in the security node, and the first key, and to deny unrestricted access to the network for that terminal unless the expected and received authentication codes match.

The invention further provides a customer terminal for a communications network, the terminal comprising a customer port for customer equipment compatible to the network, a network port for connecting the terminal to the network, processing means including a memory, the processing means being arranged to receive signals through the network port, and signalling means arranged to transmit signals through the network port, the processing means being operable, following initiation of use of the network by a user, to calculate an authentication code which is a function of a transaction number encrypted by means of a first algorithm and a first key associated with the terminal, and to enable the signalling means to transmit the authentication code through the network port.

Preferably, the signalling means is a modem, for example a FSK modem for data transmission on the network. However, other signalling means may be used. For example, a dual tone multi-frequency (DTMF)-based system could be employed.

The present invention requires only the authenticating equipment to be connected between the user's equipment, for example a telephone, and the security node governing authentication for the local exchange associated with the NTE. The authenticating equipment communicates cryptographically with the security node to provide authentication of the equipment initiating a call (but not the individual user) automatically. Thus, the authentication process takes place when the user lifts the handset, or otherwise initiates access to the network. The user does not have to insert a token or card, or key in an authorisation number.

The authenticating equipment can be line or mains powered, and may conveniently be built into a housing remote from customer equipment, for example the master socket in the customer's premises to which the telephone equipment is connected. Alternatively, the authenticating equipment may be battery powered.

While the invention is described in terms of authentication to avoid fraudulent use of telephone lines, it is applicable to other situations in which a discrimination is required based on authentication of a user. For example, the invention may equally well be arranged to restrict access to certain geographical areas on the basis of authentication.

The invention is particularly applicable to a telecommunications network, such as a public switched telephone network. However, the concept of a security node through which the traffic passes, or under the governance of which traffic is allowed to pass from the terminal to the rest of the network, is applicable to other communications system

BRIEF DESCRIPTION OF THE DRAWINGS

The invention can be put Into practice in various ways, some of which will now be described, by way of example, with reference to the accompanying drawings, in which.

DETAILED DESCRIPTION OF EXEMPLARY EMBODIMENTS

Figure 1:
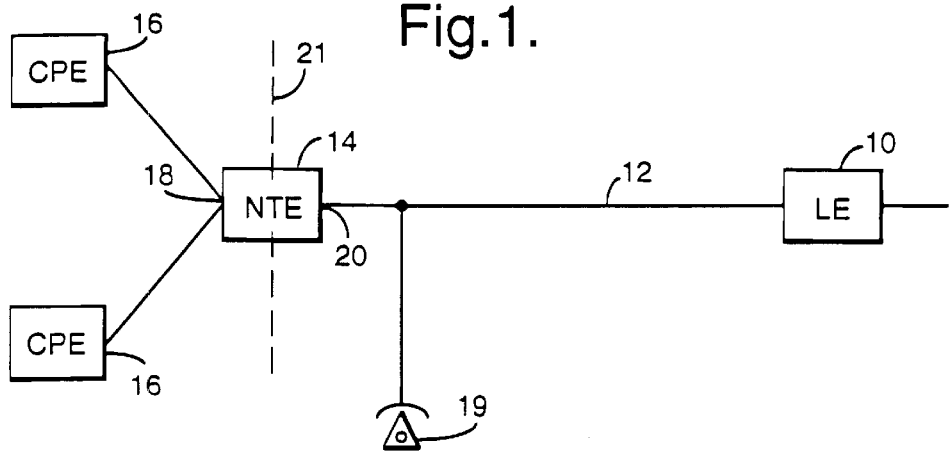
FIG. 1 is a schematic block diagram of a part of a telephone network according to the invention.

Referring to the drawings, FIG. 1 shows a PSTN having a local exchange 10 connected by a local access line 12 to a NTE 14 which is specific to a network customer. The NTE 14 is the interface between the network and the CPE 16 of that customer. The NTE 14 has a customer port 18, for example a master socket, by means of which the CPE 16 can be connected to the network, and a network port 20 by means of which the network is connected to the customer premises. Typically, the CPE 16 are telephone handsets or fax machines on the same telephone number.

It will be appreciated, by the skilled person, that a typical telephone network will consist of many customers, each having a respective NTE 14 and each being connected to one of a number of local exchanges 10 which, in turn, make up an interconnected network of various levels of exchanges (the PSTN). For reasons of clarity, FIG. 1 shows only one NTE 14, one local access line 12 and one local exchange 10.

The NTE 14 is shown divided into two by a dotted line 21. This is a notional demarcation to indicate that equipment to the left of the line 21, as depicted in the drawing, is able to participate in authentication according to the invention, whereas equipment connected to the local access line 12 to the right is not. An unauthorised telephone 19 is shown connected to the local access line 12, i.e. to the right of the dotted line 21.

Figure 2:
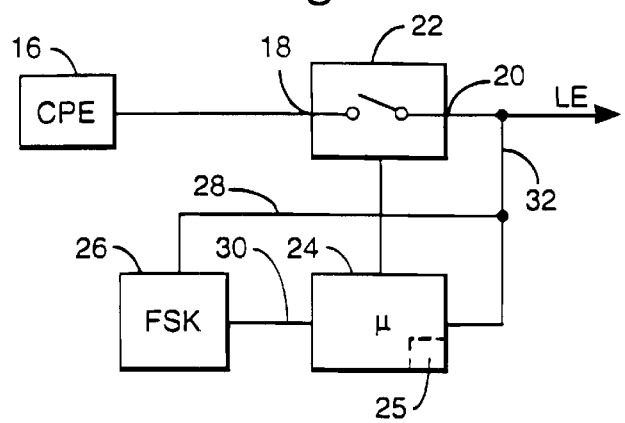
FIG. 2 is a more detailed schematic block diagram of a network terminal forming part of the network of FIG. 1.

FIG. 2 illustrates the NTE 14 of FIG. 1. A switch 22 is connected between the customer port 18 and the network port 20. The switch 22 is typically constituted by a relay (or similar means) which connects the telephone through when appropriate. A microprocessor 24, having a random access memory (RAM) and a read only memory (ROM) 25, is provided within the NTE 14. The authentication connection to the local exchange 10 through the NTE 14 also includes a frequency shift keying (FSK) modem 26. The FSK modem 26 is operably connected to the local access line 12 for connection to the local exchange 10 by means of a line 28, and is under the control of the microprocessor 24 via a line 30. The microprocessor 24 is also connected to the local access line 12 by means of an interface 32.

A comprehensive telephone network often contains a mixture of analogue and digital switching. The local exchange 10 in this embodiment is based on a GEC Plessey Telecommunications Limited System X digital exchange. This is because the embodiment can use FSK-modem-based signalling for the telephone network local loop which is currently only being installed in exchanges such as System X. It provides a generic data transfer capability operating at, for example, 1200 bits/sec. The invention also extends to other forms and implementations and some alternatives are given.

The System X platform consists of a central digital switch block (the Digital Switching Subsystem—DSS) which switches 64 kBit/s digital circuits presented as 2 MBit/s multiplexes. The DSS is controlled, via a Message Transfer Subsystem (MTS), by a central Call Processing Subsystem (CPS). This is a common control software, and runs on a proprietary bit-slice architecture processing platform (the Processor Utility Subsystem—PUS).

Analogue telephony customers are connected to this structure by the Digital Subscriber's Switching System (DSSS) equipment, known as concentrators. This equipment provides the analogue exchange line facilities, including battery feed, ringing current, supervisory tones and, through planned modifications, the FSK signalling facilities.

Considering only the analogue telephony service, call set-up is initiated by the customer going off-hook. This is detected by the DSSS which signals this, in a PCM signalling time-slot, to the CPS via the DSS. The MTS and the DSSS Handler process also execute on the PUS. The CPS then returns instructions to the DSSS to set-up a switched path through the DSSS, apply dial tone and connect a digit receiver.

Figure 3:
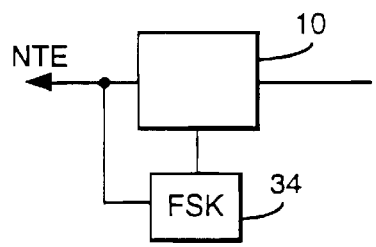
FIG. 3 is a more detailed schematic block diagram of a local exchange forming part of the network of FIG. 1.

Referring to FIG. 3, at the local exchange 10 there is a further FSK modem 34 for communicating with the NTE 14.

The local exchange 10 constitutes a security node for those NTEs connected to the network through it, i.e. it acts as a point through which all calls to, and from, the network must pass for each connected NTE. Thus, by enabling the local exchange (or the nearest node to the NTE) to conduct authentication will mean that all traffic will be passed to, or blocked from, the network according to the outcome of the authentication process.

There are a number of options for providing authentication. While the authentication facility is described in relation to the NTE 14, it could be embedded within the telephone, i.e. the CPE 16, or somewhere in between the NTE and the telephone.

The protocol for the two-way authentication process for authenticating the equipment user is as follows:
1. The security node calculates a secret key $S_j=f_j(K,TN)$, where $f_j$ is a security algorithm, K is a secret key diversification key and TN is the telephone number of the NTE 14 to be authenticated (the NTE needs to store one secret key for each value of j in its processor, j being a three bit number in this embodiment);
2. $S_j$ is loaded into the NTE during installation of the NTE by the installer using a portable programmer, or by the local exchange 10 down the local access line 12;
3. The user's telephone goes off-hook;
4. The security node recognises the change in condition, and identifies the telephone number of the user as in a conventional network;
5. The security node generates a random number (the transaction number) n, which it sends (together with j) to the NTE 14, in response to detecting the off-hook condition;
6. The NTE calculates an authentication code in reply $R=F(S_j, n)$, where F is a public algorithm, and sends it to the security node. The reply R and the telephone number TN together make up an authentication message on which the security node is able to perform authentication; and
7. The security node calculates the expected reply $E=F[f_j(K,TN),n]$, and compares this expected authentication code with the actual reply R—only if E=R does the authentication succeed.

When a telephone goes off-hook on a line equipped with the authenticating equipment, and loaded with $S_j$, and is connected to a local loop arranged to provide a security node, the telephone identity is made available to the local exchange 10 from the telephone number in the conventional way. Of course, a separate identification number could be used for the purpose of identifying the NTE 14. It is preferred that the same identifier is used both for conventional purposes, and for the system of the invention. The local exchange 10 generates the random number n and sends it, together with j, to instruct the terminal which secret number $S_j$ to use, and to act as an FSK challenge on the local access line 1 to the NTE 14. The NTE 14 then calculates its authentication code R in response, and sends that back to the local exchange 10 (also on the local access line 12) to complete the authentication message started with the NTE identifier.

The local exchange security node compares the response R with the expected value E. Whether the authentication has succeeded or not, a dial tone is then returned to the telephone through the NTE 14, and the customer can dial the number desired. If the outcome of the authentication process is positive, i.e. there is a match between the response and the expected value, the call is allowed to proceed in the normal way. If, on the other hand, the expected and received values do not match, a call is only allowed to proceed if it is recognised as either one to an emergency service or is otherwise a part of an allowable subset of calls which can be made regardless of authorisation. One alternative to this is to allow chargeable calls to be made, but for them to be logged and identified separately even though authentication has failed.

The NTE stores j secret keys $S_1, \ldots S_j$, so that the secret key can be changed, either each time authentication is tried or for any other reason.

In a one-way system, an active challenge is not present, and the security node does not need to generate a random number (the transaction number) n. When the NTE 14 goes off hook, it generates a number m by a means previously agreed with the security node. This number m is encrypted using the public algorithm F and the secret key $S_j$ to generate an authentication code $R=F(S_j, m)$. The authentication code R is then sent to the security node together with j. The security node calculates the expected reply $E=F[fj(K,TN), m]$ and compares the expected authentication code with the actual reply R. As for two-way authentication, only if E=R does the authentication succeed.

In either the two-way system or the one-way system, an inappropriate authorising NTE on a customer local access line 12 will fail to provide the correct authentication message. After a number of attempts (say three) the security node will similarly deny complete access to the illegitimate equipment.

Figure 4:
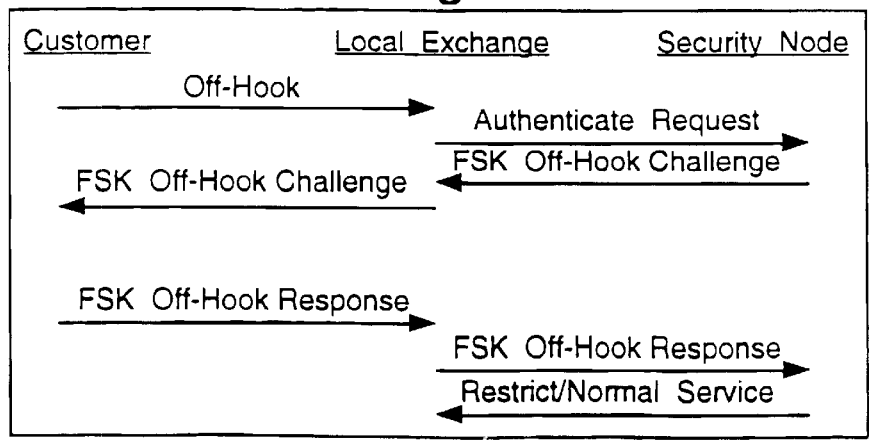
FIG. 4 is a schematic diagram of an authentication protocol message sequence.

FIG. 4 illustrates the sequence of signalling messages in a two-way implementation of the authentication protocol. It will be noted that the security node is shown separate from the local exchange 10 for the sake of clarity of illustration, although the security node can be implemented as part of the local exchange. In a unidirectional implementation, the 'Challenge' and 'Response' transmissions are not sent. The 'Off-Hook' condition is automatically followed by transmission of the authentication code and the code identifying the NTE requiring access to the network.

The most sensitive part of the authentication is the security algorithm $f_j$. This is known only by the service provider running the security node at the local exchange 10. The public algorithm F is a first line of encrypted defence, but is more exposed to analysis as it is stored within each installed authentication NTE 14. The security of the authentication system, therefore, rests largely with the sophistication of the encryption performed under the security algorithm kept in the security node.

The cryptographic requirements of the public algorithm F and the security algorithm $f_j$ should include the following:
a) F and $f_j$ should not be the same;
b) deducing $S_j$ from accumulated challenge/response/TN triples should be computationally infeasible;
c) deducing the response for a given new challenge from accumulated challenge/response/TN triples should be computationally infeasible;
d) deducing K from accumulated $TN/S_j$ pairs should be computationally infeasible;
e) deducing $S_j$ for a given TN from accumulated $TN/S_j$ pairs should be computationally infeasible;
f) the range of values of the challenge should be large enough for the probability of a given value of challenge being repeated to be minimised;

g) K and S should each be long enough for the system to be proof against exhaustive search; and h) K and S should be long enough for the system to be proof against the birthday paradox, i.e. the possibility of an attacker increasing his chances of success by finding K/S pairs instead of choosing K (or S) and trying to find S (or K).

Examples of the presently considered best practice for both F and $f_j$ are the well-known Triple-DES (Data Encryption Standard) and the International Data Encryption Algorithm which is described in 'A Proposal for a New Block Encryption Standard' by Lai and Massey, published by Springer-Verlag Lecture Notes in Computer Science No.473: EUROCRYPT 90, p.389, in which it is called the proposed European Encryption Standard.

If the original $f_j$ were disclosed, the security of the system would be compromised. Adding the secret key diversification key K means that the security of the system depends on K, not $f_j$. It is preferred to keep $f_j$ private, but if it is disclosed the security of the system would not automatically be compromised.

The embodiment of the invention in FIGS. 1 to 3 makes use of a processing capability located in the local exchange 10, along with the FSK modem 34, operably connected at the exchange line card interface. The appropriately programmed exchange line card interface, together with the FSK modem 34, constitute the security node determining the authentication. Because one of the main considerations in providing authentication is the secrecy of the security algorithm, the invention requires additional equipment at the local exchange 10 in relatively low volumes, and could be produced by the network proprietor. This ensures that sensitive security algorithm information does not have to be released to other service equipment producers, or on an otherwise inappropriately wide basis.

When the secret number $S_j$ is loaded into the processor of the NTE 14, it may be done by the service customer calling a number which will connect the NTE to an initialising facility which automatically interrogates the NTE processor for the NTE number, loads the appropriate suite of secret numbers, or replenishes spent secret numbers, and advises the customer that the task has been completed. The local loading of the secret numbers is an alternative or an adjunct to remote loading. In the latter case, if the security of the loading procedure is suspect, either on the part of the customer or the service provider, then local loading will be available to avoid the potential threat to transmission along the local access line 12.

The strength of the security provided by the authentication process has to be traded off against the need to keep the delay before a dial tone is established to a minimum. A cyclic redundancy check (CRC) is provided only if the bit transport mechanism for the network itself does not provide error checking. More than one (i.e. j) secret numbers are stored in the NTE processor so that each can be specified, either in turn or when one becomes compromised, as necessary without interruption or loss of service to the customer.

The security node will send a challenge at least three times using the same random number n, in the event that the NTE 14 does not respond, or a transmission error is detected.

Of course, in the case of an illegitimate user no reply will be generated in response to a challenge. Thus, the security node is programmed with a time-out facility. At the end of the predetermined duration, the local exchange 10 sends the dial tone to the illegitimate user in the same way as would be done for a negative authentication.

In some circumstances, the NTE 14 may detect an invalid challenge due to corrupted data which it is programmed either to ignore or to respond to by sending a negative acknowledgement message back to the security node.

It is preferable that the authentication process is active on a per call basis. This will ensure that the network validates each call, allowing early identification of the calling apparatus before allowing a chargeable call to be made. Otherwise, the customer may dispute the bill since calls billed to that account could still be unauthenticated.

The operation of a telephony service may be modelled in terms of a sequence of states a call may go through. These states, and the relationship between states, form what is termed a 'call model'. Analysis of the call model reveals that there are a number of opportunities for introducing an authentication attempt.

According to the invention, an attempt is made to authenticate after the user has indicated a wish to make a call, but before the dial tone is relieved. This dictates that the network recognises the 'off-hook' condition, and initiates an authentication attempt whenever this state occurs.

In the alternative, authentication may be carried out after dial tone. This requires clearly defined rules governing when and how an authentication interchange is initiated. Otherwise, normal telephony service may be degraded, since the authentication process may be too obtrusive to the user or, at worst, the service too cumbersome for the user ever to bother using.

There are essentially three existing opportunities for introducing an authentication sequence once dial tone (unauthenticated) has been received. First, there is the possibility of introducing an authentication sequence after dialling but before ringing tone. Second, there is the possibility of invoking an authentication sequence via a register recall function at some point. Third, there is the possibility of introducing an authentication sequence at call termination.

The authentication before dial tone protocol offers the most practicable network solution. This is because it is seen to offer a less obtrusive and more easily automated mechanism.

A requirement for the authentication protocol to be used in an authentication process is a transfer of security data between the two end points constituted by the NTE 14 and the security node at the local exchange 10 via the local access line 12. In this way, a terminal can be unambiguously identified to the network. The volume of data forming the authentication, and the time constraints on the authentication process, determine the main characteristics of the process. It has been assessed that about 10 to 20 bytes of data need to transported in both directions between the local exchange 10 and the NTE 14.

It is possible that the security algorithm $f_j$ and associated signalling mechanism could be provided in the form of equipment connected at the exchange line card interface of the local exchange 10. In this case, each subscribing customer has to have the equipment which corresponds to the NTE.

A System X exchange possesses powerful real-time computer systems upon which all the main exchange processes are executed. In practice, it is found that local exchanges are bound by memory limitations rather than processing capabilities. Therefore, there tends to be a surplus of processor power available in the exchange where the chosen security algorithm could be executed.

This would dictate that precise details of the security algorithm were made available to external suppliers of the interfaces for it to be built or programmed in. In effect, the whole implementation would have to be disseminated to third parties. This may be seen as being undesirable, in view of the highly important role the security algorithm plays in maintaining the integrity of the authentication procedure.

Advanced intelligent network (AIN) architectures present an alternative to the above. In this case, the security algorithm could be moved onto a co-located 'adjunct' processor. This would be external to the exchange system, and would require appropriate interfaces with the exchange equipment. This could be achieved through a direct connection with the exchange's processor (e.g. via an Ethernet connection). Alternatively, it could be achieved via a special signalling connection on the adjunct processor and a PCM stream, or analogue connection, to the local exchange switching system.

Where the adjunct processor connects to the exchange processor, special modifications have to be carried out to all the local exchanges. This would include hardware modifications to support the computer-computer communications link, e.g. the introduction of an Ethernet port.

An alternative approach is to move the security algorithm into a self-contained element, or security node, within the central processor of the network. Appropriate signalling links to the rest of the network, and associated software modifications, could then provide the necessary communications between the node and the authentication customer equipment. This has the advantage over the previous arrangement in that a number of exchanges could be served by a single security node. Customers may, therefore, be spread over a number of exchanges rather than having to be directly connected.

Authentication based upon extensive modifications to existing or planned exchange hardware does not offer a good solution. For this reason, an adjunct processor solution is not considered to be appropriate to a telephone network.

Assuming that there was sufficient processor time and memory available, mounting the security algorithm on the local exchange processor would require releasing the security information outside of the exchange proprietor.

A separate security node solution requires modifications to individual local exchange equipment that can be limited to software sub-systems in the central processor. In addition, a single node could be connected to several local exchanges. Service can, therefore, be provided to a large number of customers by a single security node. This solution, therefore, has the advantage over the others that the authentication service is justifiable to a small, but significant, number of customers spread over a number of exchanges.

With the existing analogue telephony service, the exchange responds to the initiating telephone 'looping' the line by the application of dial tone. This conventional state in the 'call model' is modified such that the network will use this as the trigger point for generating an authentication challenge. Only once this challenge has been correctly acknowledged by an appropriately-configured authenticating telephone or other equipment, will the network permit normal telephony service to proceed for that call attempt. Failure correctly to respond to the challenge within a pre-determined time limit will force the local exchange to limit telephony service for that call to a pre-determined subset of the functions normally available, e.g. emergency and operator services.

In either the exchange line card arrangement or the separate node arrangement, a notional or actual security node is created through which calls subject to authentication must pass. Note that it could also be providing other network based services concurrently with the authentication.

In this case, it is implied that the signalling messages originate at the security node. These take the form of FSK signals where a signalling path has been extended to the security node. Alternatively, the security information may be transferred to the local exchange using main network signalling.

The security node is connected to the local exchange's trunk signalling system. Each authentication request will result in a call to the security node which will be dimensioned to serve one or more local exchanges. A key cost element of this solution, therefore, is embodied by the security node which should have the following major components:

Appropriate Signalling System
Digital Transmission System
FSK Off-Hook Signalling System
Computing System
Database
Security Algorithm
System Management System In a digital exchange, such as a System X exchange, its central processor provides the essential call control and service logic functions and is, therefore, an obvious location for all the necessary software required by the proposed security node aspects of the authentication system. In this case, when the concentrator indicates to the central processor that a line has gone off-hook, the central call control functions generate the required authentication challenge data, and transmit this to the NTE 14 via the FSK modem 34 in the concentrator—rather than responding immediately with a connect dial-tone instruction. The concentrator then passes either the returned FSK challenge acknowledgement to the central processor, or it returns an indication that no FSK data was received within the specified response time. Call processing may then determine what level of service to be set for the rest of the call, and instruct the concentrator to return the appropriate dial tone (via a conventional Send All Digits message).

Since this approach requires only FSK capabilities along with the normal telephony facilities within the concentrator; and relies-upon modifications to main exchange software, it offers a very flexible route to service provision in an exchange. This is because central software modules are loaded from tape or other flexible media—as opposed to being held as firmware—and provide service to the whole exchange structure, rather than just associated concentrator lines.

An alternative approach to providing the majority of the authentication capabilities in the central processor would be to provide all the main functions within the concentrator unit. Only once a call attempt had been validated, would central call processing be notified, along with the level of service to be provided, i.e. rather than indicating the off-hook condition to the central call processing software, the concentrator would authenticate the off-hook condition and then inform central call processing that the line was off-hook and request the appropriate level of service dependent upon whether the call attempt had passed or failed authentication.

As a further alternative, in a split central processor/concentrator solution, the authentication algorithm can be incorporated in the central exchange processor, but with the analysis of the challenge acknowledgement being performed by the concentrator. Upon the off-hook condition being detected, the concentrator would forward this signal to the central processor and receive from it the authentication challenge and the expected acknowledgement. This data could be generated during idle time on the processor, such as during the night, when spare processor capacity could be used to produce sets of authentication data for the next day. In either case, whether the data is generated on-line or off-line, it would be up to the concentrator to determine whether the response from the NTE matched that expected and to indicate to the central processor which level of service should be provided.

A complementary solution to the split central processor/concentrator is the split concentrator/central processor solution. In this case, the decision logic is within the central call processing, and the authentication algorithm is located within the concentrator. When a line enters the off-hook state, the concentrator generates both the challenge and the expected acknowledgement. The challenge is then transmitted to the NTE and the concentrator awaits the receipt of the NTE response. The central processor then receives the response from the NTE via the concentrator along with the received response, performs the comparison with the expected response, and sets up the appropriate level of service.

What is claimed is:

1. A telecommunications station for use with a telecommunications network, said station performing an authentication process in which said station exchanges authentication signals with the network and permits exchange of telecommunications traffic with the network only when said authentication process is successful, said station comprising:
    a network termination unit with a network port for connection to said network, and a terminal port for connection to separate non-authenticating user equipment;
    separate non-authenticating user equipment removably connected to said terminal port;
    wherein:
        said network termination unit contains circuitry, connected to said network port, for performing said authentication process automatically upon detection of an off-hook condition indicating initiation of use of said separate non-authenticating user equipment and without further user intervention, and a switch connected between said terminal port and said network port, said switch being responsive to signals from said authentication circuitry to permit exchange of said telecommunications traffic between said user equipment and said network only when said authentication process is successful.

2. An authentication station for connection between a telecommunications network and separate non-authenticating user equipment, comprising:
    a network port for connecting the authentication station to the telecommunications network;
    a terminal port for removably connecting the authentication station to the separate non-authenticating user equipment, said separate non-authenticating user equipment being incapable of providing authentication for any other equipment connected thereto; and
    authentication circuitry for automatically, upon detection of an off-hook condition indicating initiation of use of said separate non-authenticating user equipment and without further user intervention, exchanging authentication signals with the network and permitting exchange of telecommunications traffic between the telecommunications network and the separate non-authenticating user equipment only when an authentication process between the telecommunications network and said authentication station permits said exchange.

3. A method of authenticating a line of a communications network automatically upon detection of an off-hook condition of separate non-authenticating user equipment and without further user intervention, the line being connected to a network termination unit, said network termination unit not functioning as a user terminal and having a port for removable operative connection to said separate non-authenticating user equipment, the method comprising the steps of:
    detecting an off-hook condition of the separate non-authenticating user equipment;
    indicating to a security node associated with the network that a user of the network termination unit requires use of the network;
    calculating an authentication code at the network termination unit, the authentication code being a function of a transaction number encrypted by means of at least one first key associated with the termination unit, and an algorithm;
    transmitting the authentication code to the security node;
    calculating an expected authentication code at the security node based on the transaction number, the algorithm and said at least one first key;
    comparing the expected authentication code with the received authentication code; and
    denying unrestricted access to the network for the network termination unit unless the expected and received authentication codes match.

4. A method as claimed in claim 3, in which the security node calculates said at least one first key for the network termination unit, each said at least one first key being a function of a security algorithm stored within the node, an identification code for the network termination unit and a second key, each said at least one first key being loaded into the network termination unit for later use with the first algorithm in authenticating a line.

5. A method as claimed in claim 4, in which a first key is loaded into the network termination unit remotely by the security node, or locally from storage means connected temporarily to the unit.

6. A method as claimed in claim 3, in which the security node generates the transaction number, which is sent as a challenge to the network termination unit in response to the indication received by the security node that the user requires use of the network.

7. A method as claimed in claim 3, in which the network termination unit transmits a negative acknowledgment to the security node when no challenge, or an invalid challenge, is received following an indication that the user requires use of the network.

8. A method as claimed in claim 3, in which the security node permits a dial tone to be established with the network termination unit independent of the result of the authentication.

9. A method as claimed in claim 3, in which the telecommunications network has a plurality of exchanges, each for routing traffic to, and from, a plurality of network termination units, at least one of the exchanges having the security node associated therewith.

10. A system for authenticating lines of a communications network automatically upon detection of an off-hook condition of separate non-authenticating user equipment each connected to the network via a network termination unit and without further user intervention, comprising:
    a plurality of network termination units each connected to the network, each of said plurality of network termination units not functioning as a user terminal and having a terminal port for removable operative connection to said separate non-authenticating user equipment compatible with the network, at least one of the network termination units comprising processing means including a memory, and signaling means operably connected to the network and enabled by the processing means, the signaling means being arranged to transmit to the line an authentication code automatically after a potential user initiates a use of the network, the authentication code being calculated by the processing means as a function of a transaction number encrypted by means of an algorithm and a key associated with that network termination unit; and a security node operable to receive authentication codes from the network termination units, to determine whether a received code corresponds, in accordance with said algorithm, to the transaction number a key corresponding to that network termination unit, and to deny unrestricted access to the network for that unit unless such correspondence is found.

11. A system as claimed in claim 10, in which the security node includes means operable to calculate the first key as a function of a security algorithm stored in the node, an identification code for that network termination unit, and a second key, and to transmit the first-mentioned key to that unit for later use in the authentication of that unit.

12. A system as claimed in claim 10, in which the security node further includes means operable to generate the transaction number, and node signaling means for sending the transaction number as a challenge to a line in response to an indication received by the security node that the user of that line requires use of the network.

13. A system as claimed in claim 10, in which the network termination unit includes means for transmitting a negative acknowledgment to the security node when no challenge, or an invalid challenge, is received following an indication that the user requires use of the network.

14. A system as claimed in claim 10, in which the network is a telecommunications network having a plurality of exchanges, each for routing traffic to, and from, a number of network termination units, at least one of the exchanges having the security node associated therewith.

15. A system as claimed in claim 14, in which the security node is arranged to permit a dial tone to be established with that network termination unit independent of the result of the authentication.

16. A network termination unit for a communications network, the network termination unit not functioning as a user terminal and comprising a terminal port for removable operative connection to separate non-authenticating user equipment compatible with the network, a network port for connecting the network termination unit to a line of the network, processing means including a memory, and signaling means arranged to transmit signals through the network port, the processing means being operable, following initiation of use of the network by a user, to automatically, upon detection of an off-hook condition of said separate non-authenticating user equipment connected to said network termination unit and without further user intervention, calculate an authentication code which is a function of a transaction number encrypted by means of an algorithm and a key stored in the processing means and to enable the signaling means to transmit the authentication code through the network port.

17. A network termination unit as claimed in claim 16, in which the processing means is arranged to receive signals through the network port and is responsive to a challenge signal from the network to calculate the authentication code and to enable the signaling means, the transaction number being obtained from the challenge signal.

18. A network termination unit as claimed in claim 17, in which the processing means includes error checking means for signals received through the network port, the processing means being operable to enable the signaling means to transmit a negative acknowledgment in the event that an invalid challenge is received from the network.

19. A communications network comprising:

a plurality of network termination units connected to the network, said network termination units not functioning as a user terminal and including a terminal port for removable operative connection to separate non-authenticating user equipment;

at least one of said plurality of network termination units comprising a processor, said processor including a memory and a signaling circuit enabled by said processor and operatively connected to the network;

said signaling circuit being arranged to transmit an authentication code automatically, upon detection of an off-hook condition of said separate non-authenticating user equipment connected to said network termination unit and without further user intervention, said authentication code being determined by the processor based on a transaction number encrypted by an algorithm and a key associated with the network termination unit; and a security node operable to receive authentication codes from the network termination units, said security node further determining whether a received code corresponds to the transaction number and a key corresponding to that network termination unit, said security node denying unrestricted access to the network for that unit unless a correspondence is found.

20. A network termination unit that does not function as a user terminal comprising:

a terminal port for removably operatively connecting the network termination unit to separate non-authenticating user equipment;

a network port for connecting the network termination unit to a line of a communications network; and a processor including a memory and a signaling circuit arranged to transmit signals through the network port, said processor being operable, automatically, upon detection of an off-hook condition of said separate non-authenticating user equipment connected to said network termination unit and without further user intervention, to determine an authentication code based on a transaction number encrypted by means of an algorithm and a key stored in the processor, said processor further enabling the signaling circuit to transmit the authentication code through the network port.

* * * * *